United States Patent Office 3,035,891
Patented May 22, 1962

3,035,891
PROCESS FOR THE PRODUCTION OF ALKALI METAL AND ALKALINE EARTH METAL BOROHYDRIDES
Roland Köster, Mulheim (Ruhr), Germany, assignor to Studiengesellschaft Kohle m.b.H., Mulheim (Ruhr), Germany
No Drawing. Filed July 9, 1957, Ser. No. 670,665
Claims priority, application Germany July 12, 1956
17 Claims. (Cl. 23—14)

This invention relates to a process for the production of alkali metal and alkaline earth metal borohydrides.

It is known that N-trimethylborazane can be produced from borine carbonyl and trimethylamine or from diborane and trimethylamine (see Journal of the American Chemical Society 59, 785/6 (1937)). It has also already been proposed to produce N-trialkyl borazanes from boron alkyls, or boron compounds containing hydrocarbon radicals, and from tertiary amines and hydrogen by heating under pressure cf. R. Köster, Ang. Chemie, 69, 94 (1957)), a reaction which proceeds according to the equation $$BR_3 + N(R'_3) + 3H_2 \rightarrow 3RH + N(R'_3).BH_3$$

(Each R and R' represents a hydrocarbon radical.) This reaction takes place so smoothly that it is undoubtedly the best method up to the present of hydrogenating boron compounds to form boron hydrides.

At room temperature, most of the N-trisubstituted borazanes are either liquids or solid compounds which are readily soluble in hydrocarbons, and contain boron hydride $B_2H_6$ which is usually a gas, in combined form. Since these compounds are not particularly sensitive to air or moisture, they can be handled substantially more easily than free diborane $B_2H_6$. In addition, many different chemical reactions which can be carried out with, for example, the N-trialkylborazanes, can also be effected with diborane itself.

It has now been found that by treating borazanes having 3 hydrocarbon radicals, especially N-trialkyl borazanes, with alkali metal or alkaline earth metal compounds of the general formula MeX or MeX₂, in which Me represents an alkali metal or alkaline earth metal and X represents a hydrogen atom or an R or OR radical, R being an aliphatic, aromatic or hydro-aromatic hydrocarbon radical, or with complexes of these compounds with boric acid esters or boron hydrocarbons, the substituted borazanes can be split, and in this way alkali metal or alkaline earth metal borohydrides and tertiary amines are obtained. The trialkylamine or other trisubstituted amine which is liberated in the reaction can thereafter be used again without any difficulty for the production of N-trisubstituted borazanes.

When metal hydrides are used for the splitting operation, the reaction proceeds for example in accordance with the equation $$NR'_3.BH_3 + NaH \rightarrow NaBH_4 + NR'_3$$

If the splitting is effected with a metal compound of the general formula MeX or MeX₂, boron compounds of the general formula BX₃ are formed as well as the metal boro-hydrides, X in this formula representing an R or OR radical $$3MeX + 4BH_3.NR_3 \rightarrow 3MeBH_4 + 4NR_3 + BX_3$$
$$3MeX_2 + 8BH_3.NR_3 \rightarrow 3Me(BH_4)_2 + 8NR_3 + 2BX_3$$

When R is a lower hydrocarbon radical, these boron compounds are readily volatile compounds which can easily be separated from the reaction mixture by distillation. If the boron compounds BX₃ are less readily volatile, the metal borohydrides formed are preferably separated out by a simple extraction treatment with a solvent in which the boron compounds are readily soluble and the metal borohydrides are insoluble.

The result obtained by the process of the invention is surprising, in that the trisubstituted borazanes, especially the N-trialkyl borazanes, are in fact very stable substances which do not split off any diborane, for example on heating. It could consequently not be foreseen that a splitting operation in accordance with the invention would take place. The process constitutes a technical advance over the existing state of the art, and in particular it is particularly advantageous because it does not necessitate the use of pressure, and in addition substances are involved which can be readily obtained as liquids and can be conveniently handled.

Since the production of the metal hydrides suitable as starting material for the process of the invention is difficult in certain circumstances, it may be particularly advantageous to use metal alcoholates, since the metal alcoholates can be produced in a simple manner from metal hydroxides and an alcohol (for example phenol).

The process of the invention can be carried out in an extremely simple manner. As solvent, it is possible to use a hydrocarbon which preferably has a boiling point which differs from that of the boron compound being formed. It is also possible to work without solvents or to using as solvent an excess of the borazane to be split.

It is advantageous to work at temperatures from 80° C. up to the decomposition temperatures of the alkali metal or alkaline earth metal borohydrides, especially temperatures above 100° C.

The reactions proceed particularly smoothly and quantitatively at temperatures between 100 and 150° C. At these temperatures the metal borohydrides are obtained directly as a residue in ultra-pure form after the amine which has been liberated, and also the volatile boron compound and the borazane, have been distilled off. Distillation is preferably carried out at reduced pressure and the residue of the product is preferably dried under high vacuum. Dissolvation and recrystallisation are then not necessary.

In order to guarantee complete conversion and to accelerate the reaction, it may be advantageous for the trialkyl borazane or the analogous compound which is used to be in excess with respect to the metal hydride, this excess being thereafter recovered by extraction with a suitable solvent, or by simple distillation, and reused.

If complex salts of the alkali metal alkaline earth metal alcoholates with boric acid esters or boron hydrocarbons are used for the splitting operation instead of the said compounds themselves, the reaction takes place in accordance with the equation $$3M(B(OR)_4) + 4BH_3.NR_3 \rightarrow 3MBH_4 + 4B(OR)_3 + 4NR_3$$

in which R has the meaning set forth above.

The boric acid esters formed in the process of the invention can readily be converted into corresponding boron hydrocarbons by using aluminum hydrocarbons, whereby starting materials for the production of further N-trihydrocarbon borazanes are obtained.

The following examples further illustrate the invention.

*Example 1*

$$NaH + N(C_2H_5)_3.BH_3 \rightarrow NaBH_4 + N(C_2H_5)_3$$

230 g. of N-triethyl borazane (2.0 mols) are mixed with a suspension of very finely divided sodium hydride (36 g.=1.5 mols) in 100 cc. of ethyl cyclohexane and heated to the boiling point for 2–3 hours while stirring thoroughly. The temperature in the reaction mixture should as far as possible be higher than 100° C. All the solvent is then distilled off together with the triethylamine (a total of 150 g.) which is formed. To complete the reaction, heating is continued for about 30 minutes at 150° to 180° C. in excess N-triethyl borazane whilst stirring. The latter is thereafter recovered by distillation in water jet vacuum (B.P.$_{14}$=100/1° C.). A completely colourless analytically pure sodium borohydride is obtained as residue in a quantitative yield (56 g.). This can be used directly for further experiments without being further dissolved and recrystallised. The decomposition with dilute acid of a sample of the sodium borohydride obtained yields the corresponding quantity of hydrogen.

Example 2

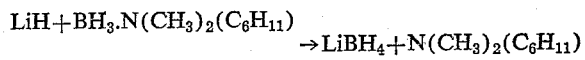

$$LiH + BH_3 \cdot N(CH_3)_2(C_6H_{11}) \rightarrow LiBH_4 + N(CH_3)_2(C_6H_{11})$$

170 g. (1.2 mols) of N-dimethyl cyclohexyl borazane are heated to 140 to 150° C. together with 8 g. (1.0 mol) of very finely powdered lithium hydride while stirring well (preferably after adding about 50 cc. of dibutyl ether) and allowed to react for 3 hours. At the end of this time the lithium hydride has been completely converted into lithium borohydride. This product is filtered off and washed with hexane. 22 g. of lithium borohydride are obtained in pure form the theoretical amount of hydrogen is obtained on decomposition with dilute acid. The dimethyl cyclohexylamine formed and the excess borazane can after the addition of a boron trialkyl, be reconverted with hydrogen under pressure into the starting material for the reaction without it being necessary previously to separate the two substances. The dibutyl ether does not interfere in any way with the subsequent hydrogenation reaction.

Example 3

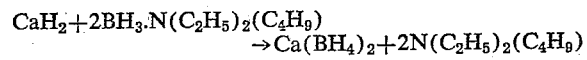

$$CaH_2 + 2BH_3 \cdot N(C_2H_5)_2(C_4H_9) \rightarrow Ca(BH_4)_2 + 2N(C_2H_5)_2(C_4H_9)$$

A mixture of a suspension of 84 g. of calcium hydride (2.0 mols) in 300 cc. of decahydronaphthalene and 645 g. (4.5 mols) of N-diethyl butyl borazane is reacted for 2–3 hours at 100 to 140° C. in a 2.5 litre ball mill which can be heated and which is provided with a reflux condenser. Thereafter the calcium borohydride suspension which is formed is filtered with a porcelain suction filter. 138 g. (about 2 mols) of calcium borohydride are left on the filter; this residue is dried in vacuo after washing with a small quantity of hexane. The filtrate contains the diethyl butylamine formed in the reaction and the decahydronaphthalene used, and also the excess of the borazane. The tertiary amine can be recovered by a simple distillation process and then be reacted again with a boron trialkyl and hydrogen under pressure to form N-diethyl butyl borazane. The recovered N-diethyl butyl borazane, dissolved in decahydronaphthalene, is best used again for the production of more alkali metal or alkaline earth metal or alkaline earth metal borohydride.

Example 4

$$KH + BH_3 \cdot N(C_4H_9)_3 \rightarrow KBH_4 + N(C_4H_9)_3$$

Brief heating of a mixture of 40 g. (1 mol) of potassium hydride and 200 g. (1 mol) of N-tri-n-butyl borazane leads directly to the formation of potassium borohydride, which is obtained in pure form after separating out the tributylamine (by distillation or filtration). Drying is effected in vacuo by heating to a temperature higher than 100° C. The yield is quantitative (53 g.).

Example 5

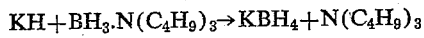

$$Na(BH(OCH_3)_3) + BH_3 \cdot N(C_2H_5)_3 \rightarrow NaBH_4 + B(OCH_3)_3 + N(C_2H_5)_3$$

512 g. (4.0 mols) of sodium trimethoxy borohydride are reacted in 1 litre of perhydrocumene together with 500 g. (4.35 mols) of N-triethyl borazane while stirring well, the reaction taking place for 3 hours at the boiling point of the solvent (140–150° C. internal temperature), the liberated boron ester being slowly distilled off together with the amine. The sodium borohydride formed is worked up either by filtration or by distillation of the solvent. The yield in this reaction also is substantially quantitative.

Example 6

$$Na(B(C_2H_5)_3H) + H_3B \cdot NR_3 \rightarrow NaBH_4 + B(C_2H_5)_3 + NR_3$$

Using the method of Example 5, a residue consisting of 37 g. (99% of the theoretical) of analytically pure sodium borohydride is obtained from 122 g. (1 mol) of sodium triethyl borohydride and 115 g. (1 mol) of N-triethyl borazane after distilling off the liberated boron triethyl and triethylamine.

Example 7

$$3KOCH_3 + 4BH_3 \cdot NR_3 \rightarrow 3KBH_4 + B(OCH_3)_3 + NR_3$$

182.5 g. (1.5 mols) of N-triethyl borazane are quickly added to a finely divided and well stirred suspension of 70 g. (1 mol) of potassium methylate in 250 cc. of isopropylcyclohexane, preferably under nitrogen and with the exclusion of moisture, the boric acid trimethyl ester formed being distilled off together with the amine liberated. The substance is heated for 2 hours at 140° C. and all the solvent is thereafter distilled off under reduced pressure (B.P.$_{13/4\ mm}$=45° C.); finally, after recovering the excess borazane (B.P. 13/4 mm.=100/1° C.), a colourless analytically pure potassium borohydride is obtained as residue in a quantity of 54 g., this being a quantitative yield.

Example 8

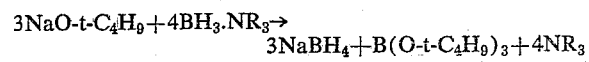

$$3NaO\text{-}t\text{-}C_4H_9 + 4BH_3 \cdot NR_3 \rightarrow 3NaBH_4 + B(O\text{-}t\text{-}C_4H_9)_3 + 4NR_3$$

96 g. (1 mol) of sodium-tert-butylate in 600 cc. of decahydronaphthalene are heated to 140° C. while stirring, the alcoholate dissolving completely. 182.5 g. (1.5 mols) of N-triethyl borazane are added; the sodium borohydride formed is precipitated and the triethylamine is distilled off. After heating for 2 hours, the boric acid tri-tert-butyl ester (B.P.$_{74\ mm.}$=101° C.) is first of all distilled off in vacuo, and thereafter the solvent is recoverd together with the excess borazane. A colourless residue (sodium borohydride) is left; the yield is quantitative.

Example 9

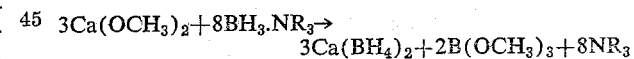

$$3Ca(OCH_3)_2 + 8BH_3 \cdot NR_3 \rightarrow 3Ca(BH_4)_2 + 2B(OCH_3)_3 + 8NR_3$$

182.5 g. (1.5 mols) of N-triethyl borzane are added dropwise at 140° C. to 61 g. (0.5 mol) of calcium methylate in 500 cc. of dibutyl ether, the amine being distilled off (together with the boric acid trimethyl ester). Heating is continued for 2 hours and analytically pure calcium borohydride is obtained with a quantitative yield after the volatile compounds have been distilled off in vacuo.

Example 10

$$3NaOC_6H_5 + 4BH_3 \cdot NR_3 \rightarrow 3NaBH_4 + B(OC_6H_5)_3 + 4NR_3$$

A suspension of 116 g. (1 mol) of dried sodium phenate in 750 cc. of perhydrocumene or xylene is heated to 140° C. 153 g. (1.33 mols) of N-triethyl borazane are added, the amine immediately distilling off. Heating is continued for another 4 hours and thereafter the solvent is distilled off in a water jet vacuum. A residue is obtained which is submitted to extraction with a solvent (for example a saturated aliphatic hydrocarbon or methylene dichloride). Sodium borohydride in pure form is left as a colourless powder with a substantially quantitative yield. After distilling off the solvent, boric acid triphenyl ester is obtained from the clear solution, and this phenyl ester is obtained in pure form by vacuum distillation (B.P.$_{0.1\ mm.}$=136/7° C.).

Example 11

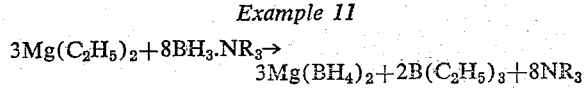

$$3Mg(C_2H_5)_2 + 8BH_3 \cdot NR_3 \rightarrow 3Mg(BH_4)_2 + 2B(C_2H_5)_3 + 8NR_3$$

310 g. (2.69 mols) of N-triethyl borazane are gradually added dropwise to a suspension of 82 g. (1 mol) of magnesium diethyl in 400 cc. of perhydrocumene at 120° C. under nitrogen and with exclusion of moisture, boron triethyl being distilled off together with triethylamine and a solid substance separating out. After the addition of the residual borazane fractions, the solid substance dissolves; two liquid layers are formed, the upper layer containing practically all the solvent, while the lower layer contains magnesium borohydride in the form of its triethyl aminate. It is distilled off under reduced pressure: a syrup-like magnesium borohydride is initially obtained, this still containing triethylamine. Triethylamine can be split off therefrom under high vacuum at about 200° C., so that pure magnesium borohydride is left (yield almost quantitative).

*Example 12*

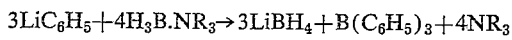

92 g. (0.8 mol) of N-triethyl borazane are added to a solution of 50.4 g. (0.6 mol) of lithium phenyl in 500 cc. of absolute ether. The ether is distilled off and the substance is thereafter heated for 2–3 hours while stirring well to 140–150° C. after the addition of 200 cc. of dry xylene. A total of 80 g. of triethylamine is obtained in the distillate (calculated by titration). A substance is filtered off from the precipitated lithium borohydride; after washing with benzene and drying, there are obtained 13 g. (98.5% of the theoretical) of an analytically pure compound. After the filtrate has been concentrated by evaporation, 48 g. of residue are recovered; by vacuum distillation (B.P.$_{0.7\ mm}$=147/8° C.), 46 g. of boron triphenyl are obtained therefrom with a true melting point of 143° C., the yield being 95% of the theoretical.

What I claim is:

1. A process for the production of a metal borohydride which comprises reacting a compound having the general formula $NR_3.BH_3$ wherein R represents a member selected from the group consisting of aliphatic, cycloaliphatic and aromatic hydrocarbon radicals with a member selected from the group consisting of alkali metal and alkaline earth metal compounds having the general formulae MeX and MeX$_2$ wherein Me represents a member selected from the group consisting of alkali and alkaline earth metals and X represents a member selected from the group consisting of hydrogen, R and OR radicals wherein R is as defined above and recovering the metal borohydride thereby formed.

2. A process for the production of a metal borohydride which comprises reacting a compound having the general formula $NR_3.BH_3$ wherein R represents a member selected from the group consisting of aliphatic, cycloaliphatic and aromatic hydrocarbon radicals with a complex of a member selected from the group consisting of boric acid esters and compounds having the general formula $BR_3$ wherein R is as defined above with a member selected from the group consisting of alkali metal and alkaline earth metal compounds having the general formulae MeX and MeX$_2$ wherein Me represents a member selected from the group consisting of alkali and alkaline earth metals and X represents a member selected from the group consisting of hydrogen, R and OR radicals wherein R is as defined above and recovering the metal borohydride thereby formed.

3. A process according to claim 1 wherein said compound $NR_3.BH_3$ is an N-trialkyl borazane.

4. A process according to claim 1 which comprises effecting said reaction at a temperature of between 80° C. and the decomposition temperatures of the metal borohydride.

5. A process according to claim 4 which comprises effecting said reaction at a temperature between 100 and 150° C.

6. A process according to claim 1 which comprises effecting said reaction in the presence of a solvent.

7. A process according to claim 6 wherein said solvent is a borazane $NR_3.BH_3$ as defined above which is accordingly used in said reaction in excess.

8. A process according to claim 1 wherein, in said metal compound selected from the group consisting of MeX and MeX$_2$, X represents a member selected from the group consisting of R and OR radicals, R being as defined above and said reaction is effected in the presence of a solvent having a boiling point which differs from that of the boron compound having the formula BX$_3$ formed in said reaction.

9. A process according to claim 1 wherein said metal compound is a metal hydride and wherein said hydride is used in the form of a suspension thereof.

10. A process according to claim 1 which comprises separately recovering the borohydride formed from the other components of the reaction mixture by distillation.

11. A process according to claim 10 which comprises effecting said distillation at a reduced pressure.

12. A process according to claim 8 which comprises separately recovering the borohydride formed from the other components of the reaction mixture by extracting said reaction mixture with a solvent in which said boron compound BX$_3$ is readily soluble and said borohydride substantially insoluble.

13. A process according to claim 1 which comprises effecting said reaction in a nitrogen atmosphere.

14. A process according to claim 1 which comprises effecting said reaction in the substantial absence of any moisture.

15. A process according to claim 2 wherein said complex is a complex of a boron-trialkyl with said metal compound.

16. A process according to claim 1 wherein in said compound $NR_3.BH_3$, R is a member selected from the group consisting of alkyl and cycloalkyl radicals, wherein all of said R substituents need not be the same.

17. A process according to claim 1 wherein in said metal compound X is a member selected from the group consisting of R and OR radicals, in which R represents a member selected from the group consisting of alkyl, cycloalkyl and phenyl radicals.

References Cited in the file of this patent

UNITED STATES PATENTS 2,545,633    Schlesinger   ---------- Mar. 20, 1951
2,880,058    Bronaugh   ------------ Mar. 31, 1959

OTHER REFERENCES

Hurd: Chemistry of the Hydrides, John Wiley and Sons, Inc., N.Y. (1952), pages 85, 161.

"Hydrides of Boron XII Symmetrical Dimethyl Diborane and the Methyl Derivatives of Borine Trimethylamine," by H. I. Schlesinger et al., publ. in the Jour. of the Amer. Chem. Soc., vol. 61, page 1081.

Schechter et al.: "Boron Hydrides and Related Compounds," prepared under Contract NOa(s) 10992 for Dept. of Navy, Bureau of Aeronautics, prepared by Callery Chem. Co., printed March 1951, declassified December 1953, pp. 31, 50, 90.

Stone: Quarterly Reviews, vol. 9, pp. 184, 192, 197 (1955).

Chemical Engineering, May 1957, page 166, col. 3.

Kirk-Othmer: Encyclopedia of Chem. Technology, vol. 2, publ. by the Interscience Encyclopedia, Inc., N.Y., p. 598 (1948).

UNITED STATES PATENT OFFICE
CERTIFICATION OF CORRECTION

Patent No. 3,035,891                      May 22, 1962

Roland Köster

It is hereby certified that error appears in the above numbered patent requiring correction and that the said Letters Patent should read as corrected below.

Column 1, line 20, after "pressure" insert an opening parenthesis; line 25, for "(Each R and R' represents a hydrocarbon radical.)" read -- (each R and R' represents a hydrocarbon radical). --; column 2, line 63, for the left-hand portion of the formula reading "NaT" read -- NaH --; column 3, line 25, after "acid" insert a closing parenthesis; column 4, line 48, for "borzane" read -- borazane --; line 62, strike out "and", second occurrence.

Signed and sealed this 18th day of September 1962.

(SEAL)
Attest:

ERNEST W. SWIDER
Attesting Officer

DAVID L. LADD
Commissioner of Patents